(12) United States Patent
Dam

(10) Patent No.: US 6,223,040 B1
(45) Date of Patent: Apr. 24, 2001

(54) METHOD AND A SYSTEM IN A CELLULAR NETWORK

(75) Inventor: Henrik Revsbech Dam, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/103,028

(22) Filed: Jun. 23, 1998

(30) Foreign Application Priority Data

Jun. 24, 1997 (SE) .................................................... 9702404

(51) Int. Cl.$^7$ ...................................................... H04Q 7/36
(52) U.S. Cl. ............................ 455/447; 455/63; 455/502; 370/337; 370/347; 370/350
(58) Field of Search ...................................... 455/462, 426, 455/449, 101, 447, 67.6, 63, 502, 59, 65; 370/347, 320, 328, 336, 337, 341, 441, 350; 375/202, 231, 330, 326, 299, 296

(56) References Cited

U.S. PATENT DOCUMENTS

| 4,642,806 | 2/1987 | Hewitt et al. |
| 4,941,155 | * 7/1990 | Chuang et al. ........................ 375/330 |
| 4,972,507 | 11/1990 | Lusignan . |

(List continued on next page.)

FOREIGN PATENT DOCUMENTS

| 29 43 115 | 5/1981 | (DE) . |
| 0173348 | 3/1986 | (EP) . |
| 0 208 021 | 1/1987 | (EP) . |
| 7203543 | 8/1995 | (JP) . |
| 94/30024 | 12/1994 | (WO) . |
| 95/08901 | 3/1995 | (WO) . |
| 95/17048 | 6/1995 | (WO) . |
| 95/35601 | 12/1995 | (WO) . |

OTHER PUBLICATIONS

"Jerry D. Gibson, The Communications Handbook, 1997, pp. 1147, 81.2".*
"The GSM system for mobile communications" M. Mouly and M–B Pautet, 1992, pp. 599 and 620–621.*
Mouly, M. et al., "The GSM System for Mobile Communications, A comprehensive overview of the European Digital Cellular Systems", *International Standard Book No. 2–9507190–0–7*, pp. 198–201, 346–349.

*Primary Examiner*—Lee Nguyen
(74) *Attorney, Agent, or Firm*—Burns, Doane, Swecker & Mathis, L.L.P.

(57) ABSTRACT

In a cellular mobile radio system, co-channel radio base stations are provided with a time reference signal being a synchronizing signal or a time reference from another co-channel radio base station. Each co-channel radio base station is also provided with a radio base station specific time offset differing between the co-channel radio base stations by at least a predetermined value which prevents known sequences in desired signals and known sequences in interfering signals from overlapping in a disturbing way at reception. In each co-channel radio base station, the time reference signal and the radio base station specific offset are used for the timing of sending bursts downlink from the co-channel radio base stations towards mobile radio stations. Each radio base station has functions receiving the time reference signal, storing the time offset and using the time reference signal and the time offset for the timing of the burst termination on the downlink.

17 Claims, 9 Drawing Sheets

U.S. PATENT DOCUMENTS

| | | | |
|---|---|---|---|
| 5,124,698 | | 6/1992 | Mustonen . |
| 5,155,742 | * | 10/1992 | Ariyavisitakul et al. ............ 375/231 |
| 5,177,740 | | 1/1993 | Toy et al. . |
| 5,206,855 | | 4/1993 | Schwendeman et al. . |
| 5,222,101 | * | 6/1993 | Ariyavisitakul et al. ............ 375/231 |
| 5,381,443 | * | 1/1995 | Borth et al. .......................... 375/202 |
| 5,425,049 | * | 6/1995 | Dent ..................................... 375/202 |
| 5,440,561 | | 8/1995 | Werronen . |
| 5,473,612 | | 12/1995 | Dehner, Jr. et al. . |
| 5,507,034 | * | 4/1996 | Bodin et al. ......................... 455/452 |
| 5,509,016 | | 4/1996 | Müller . |
| 5,519,710 | | 5/1996 | Otsuka . |
| 5,528,597 | * | 6/1996 | Gerszberg et al. ................... 370/347 |
| 5,590,399 | * | 12/1996 | Matsumoto et al. ................. 455/449 |
| 5,684,794 | | 11/1997 | Lopez et al. . |
| 5,870,673 | * | 2/1999 | Haartsen .............................. 455/426 |
| 5,898,929 | * | 4/1999 | Haartsen .............................. 455/462 |
| 5,914,944 | * | 6/1999 | Haugli et al. ........................ 370/320 |
| 5,930,248 | * | 7/1999 | Langlet et al. ....................... 370/347 |
| 5,949,828 | * | 9/1999 | Izumi ................................... 375/326 |

* cited by examiner

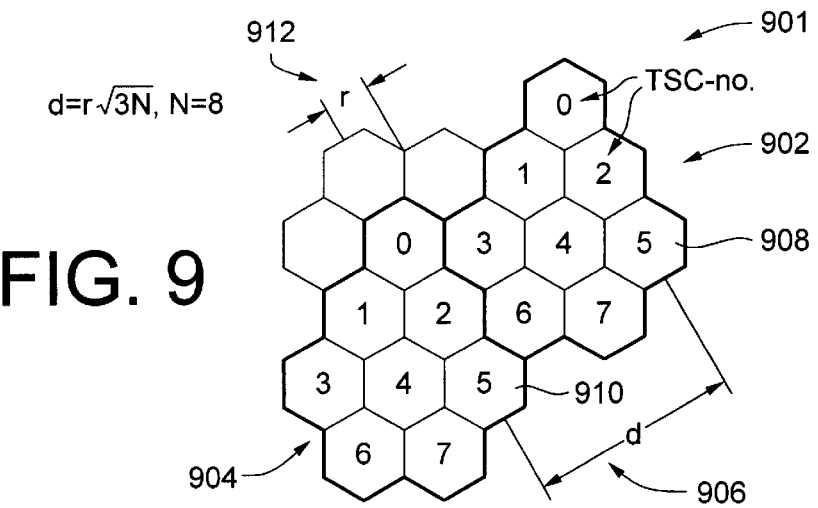
FIG. 9
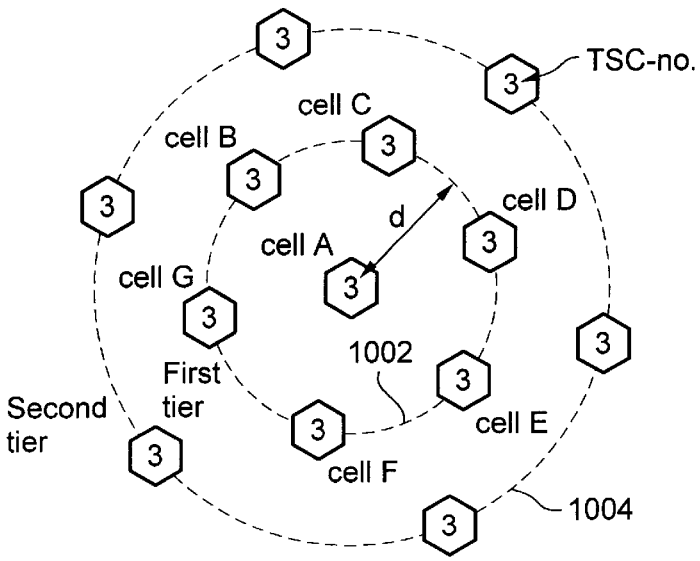
FIG. 10
| Cell to Adjust | Co-sequence Cell | Inter Cell Distance, d | Cell Radius, r |
|---|---|---|---|
| Cell A | Cell B | 2449 m | 500 m |
| ($r_A$ = 500 m | Cell C | 2449 m | 500 m |
| | . . . | . . . | . . . |
| | Cell G | 2449 m | 500 m |
| Cell B | Cell A | 2449 m | 500 m |
| ($r_B$ = 500 m | Cell C | 2449 m | 500 m |
| | . . . | . . . | . . . |
| . . . | . . . | . . . | . . . |
FIG. 11

| $\Delta t_{critical(0/0)}$ | $-5\,T_s < \Delta t < +5\,T_s$ | co-sequence interference |
| --- | --- | --- |
| $\Delta t_{critical(0/1)}$ | $0\,T_s < \Delta t < +3\,T_s$ | cochannel interference |
| ⋮ | ⋮ | cochannel interference |
| $\Delta t_{critical(0/2)}$ | not critical | cochannel interference |
FIG. 14
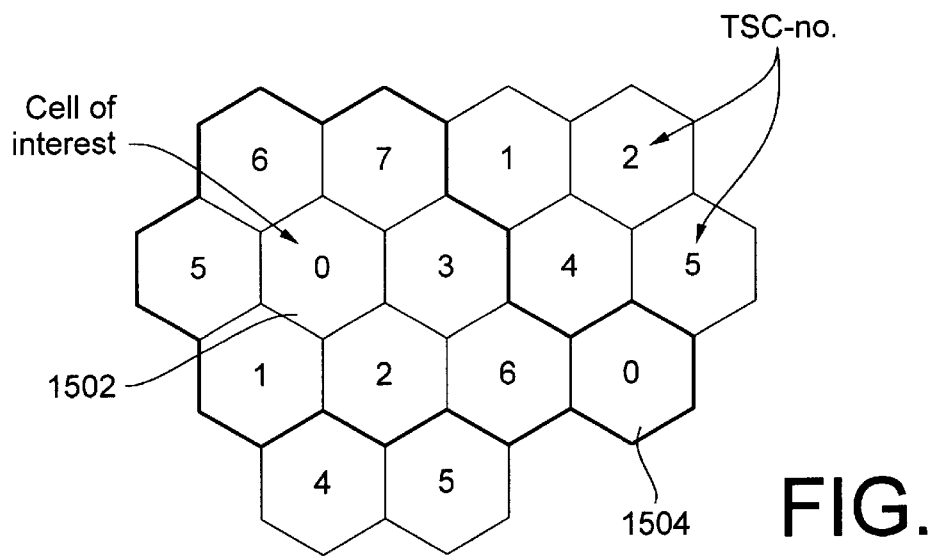
FIG. 15
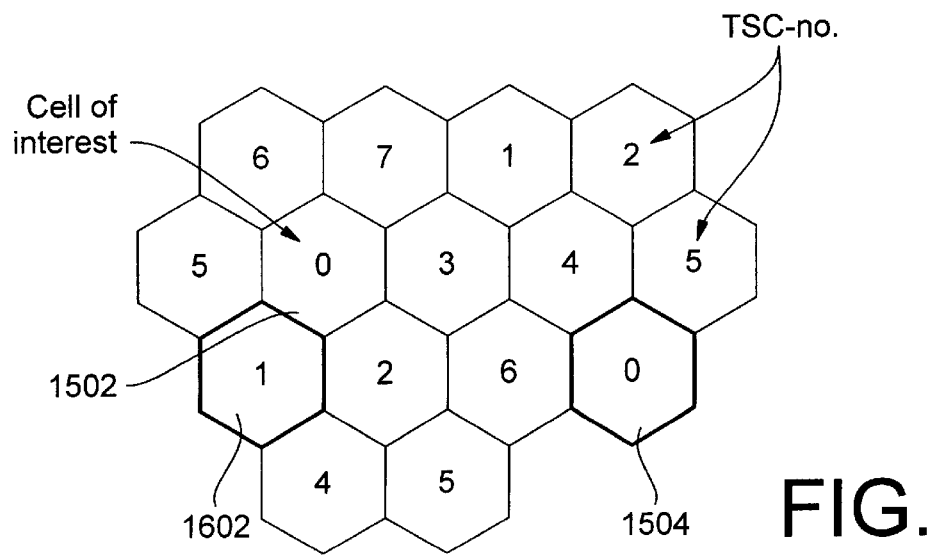
FIG. 16

METHOD AND A SYSTEM IN A CELLULAR NETWORK

BACKGROUND

The present invention according to first and second aspects generally relates to a method and a system, respectively, for counteracting interference between cells in a cellular mobile radio system including a plurality of radio base stations and mobile radio stations. More particularly, the radio base stations are of the kind using, as units of transmission; bursts organized in groups, each group forming a frame of the type used by a Time Division Multiple Access TDMA system, and each burst containing a known sequence of data bits. At least two of the radio base stations are supposed to be co-channel radio base stations employing a same frequency. According to a third aspect the invention also relates to a radio base station for use in a cellular mobile radio system of the kind mentioned.

There are a number of publications teaching synchronization of the point of time for sending information (e.g. time slots, frames, training sequences) so as to increase the correlation between the cells (or the radio transmitters). This is true e.g. in "simulcast" systems and in systems offering macro diversity (e.g. CDMA systems). U.S. Pat. No. 5,206,855 and U.S. Pat. No. 4,972,507, to be dealt with in some more detail below, describe systems wherein transmission of time slots is planned so as to avoid that cells/stations located close together send simultaneously and on the same frequency.

U.S. Pat. No. 5,206,855 discloses transmission of messages in a system using several frequencies. The messages are transmitted sequentially in such a way that messages from one cell are not transmitted simultaneously with transmission from another cell.

U.S. Pat. No. 4,972,507 relates to a method for transmitting data between the base station and the user unit in a mobile telephony system. All user units in a cell are interrogated by the base station transmitting an interrogation signal. The user units respond by sending a short message where each unit has a unique delay for avoiding that messages interfere.

U.S. Pat. No. 5,473,612 discloses how to decrease the risk for erroneous detection of a data packet in a radio communication system. The described invention is based upon the fact that packets from different stations have different delay. At reception from a certain station the synchronization sequence is searched in a time window corresponding to the delay of said station.

WO 95/35,601 discloses a method for minimizing interference from surrounding cells by using four different frequencies and directional antennas.

WO 95/17,048 discloses a radio telephony system where "co-channel interference" is reduced by assigning channels dependent on the position of the mobile unit and controlling the output power so as to make mobiles located within border areas to send with a lower power.

WO 94/30,024 describes a method for synchronizing two base stations in a CDMA system. The purpose of the synchronizing is to obtain so-called "macro diversity".

Further publications showing a more general stand of the art are U.S. Past. No. 4,642,806, EP 208,021, DE 29,43,115, WO 95/08,901, U.S. Pat. No. 5,124,698 and U.S. Pat. No. 5,509,016.

Below a number of aspects within the so-called GSM-system will first be dealt with. To the extent that some of these aspects are only mentioned below, without being described in detail, reference can be made to "The GSM System for Mobile Communications, A comprehensive overview of the European Digital Cellular Systems", by Michel MOULY and Marie-Bernadette PAUTET, also being publishers, International Standard Book No. 2-9507190-0-7.

In high traffic areas, such as large cities, the capacity of a cellular system is limited by its own interferences caused by frequency reuse. The relative interference ratio, expressed as C/I, where C is the Carrier level and I is the Interference level, may vary a lot between calls. C changes with the mobile station position relative to the base station, with the amount of obstacles between them, etc.; I changes depending on whether the frequency is being used by another call in some nearby cell, and it also varies according to the distance to the interfering source, its level, etc.

A basic concept of the GSM transmission on the radio path is that the unit of transmission, called burst, is a series of e.g. about 150 modulated bits. The GSM bursts are organized in groups of 8, such a group being referred to as a TDMA frame (TDMA—Time Division Multiple Access). Bursts have a finite duration, and occupy a finite part of the radio spectrum. They are sent in time and frequency windows, or slots. Precisely, the central frequencies of the slots are positioned every 200 kHz within the system frequency band (FDMA aspect), and they recur in time every 0.577 ms, or more exactly, every 15/26 ms (TDMA aspect). All slot time limits regarding different carrier frequencies are simultaneous in a given cell.

Within the time interval of a time slot, the amplitude of transmission rises from a starting value of 0 to its nominal value. The signal phase is modulated to transmit a packet of bits. After that, the amplitude decreases until it reaches 0.

The packet of bits used to modulate the signal phase of a burst includes a training sequence besides the variable part of the information, plus "0" bits at each end. The training sequence is a sequence of 26 bits known by the receiver. The signal resulting from the transmission of this training sequence allows the receiver to determine very precisely the position of the useful signal inside a reception time slot, and to have an idea of the distortion caused by transmission. These informations are of prime importance to obtain good demodulation performance.

There are several such training sequences defined in GSM. Thus, eight different training sequences have been specified.

One of the purposes of using training sequences is to obtain equalization.

If two signals, one desired and one interfering, arrive at a receiver at almost the same time, and their training sequences are the same, there is, in conventional receivers, no way to distinguish the contribution of each of them from the received signal. The situation is much clearer when the two training sequences differ, and are as little correlated as possible. Distinct training sequences are therefore allocated to channels using the same frequencies in cells which are close enough to interfere with one another.

The eight training sequences have been chosen for the special shape of their autocorrelation function, which is meant to ease some demodulation techniques.

SUMMARY

When planning a GSM mobile telephone network, one of the issues is normally the frequency planning, i.e. the distance between frequency reuse, and how to place different frequencies for fulfilling the capacity and coverage requirements. One limiting parameter for the planning is the distance to the closest co-channel interferer, i.e. the distance to the cells employing the same set of frequencies.

A frequency reuse scheme is basically described by the frequency reuse factor, K=g/n. This parameter describes how the available frequencies are distributed in the network. More particularly, g indicates the number of sites in a cluster of cells containing all available carrier frequencies, and n is the number of sectors in the cluster.

Today many new techniques are being studied and implemented, which make the desired signal less sensitive to co- channel interference, and thereby make it possible to reduce the reuse distance. These techniques are for instance Slow Frequency Hopping (SFH), Discontinuous Transmission (DTX), Power Control (PC), as specified in the GSM specifications. Other techniques, which are compatible with GSM, have been suggested, as e.g. smart antennas, distributed antennas etc. It may be expected that improved techniques make frequency reuse factors as K=1/1 or K=1/3 realistic.

As only a limited number of different training sequences are available, a new problem will occur; the closest co-channel interference which employs the same training sequence will come in sight of the receiving unit, i.e. base or mobile station.

Below and further on there will be used a new expression "co- sequence interference" for co-channel interference which employs the same training sequence.

The problem occurs, if the co-sequence interfering base stations have a timing of the TDMA-frame, which involves that the training sequence from the co-sequence interferer overlaps the training sequence from the desired transmitter.

A similar problem can, however, also appear for co-channel cells having different training sequences but involving undesired cross-correlation effects.

Therefore, it is an object of the present invention to provide a method and apparatus for counteracting co-sequence interference and co-channel interference due to undesired correlation effects, in digital cellular mobile radio systems, in particular those of TDMA type, but also those of CDMA type when including TDMA timing subdivision.

According to the first and second aspects referred to by way of introduction, this object is achieved by an inventive method and apparatus, respectively, providing at least two co- channel radio base stations with a time reference signal and with a radio base station specific time offset differing between the co-channel radio base stations by at least a predetermined value which prevents known sequences in desired signals and known sequences in interfering signals from overlapping in a disturbing way at reception. In each co-channel radio base station the time reference signal and the radio base station specific offset are used for the timing of sending bursts downlink from the co-channel radio base stations towards mobile radio stations.

According to the third aspect, the object is also achieved, in a system of the kind referred to, by a radio base station comprising means for receiving the time reference signal, means for storing the radio base station specific time offset, and means for making use of the time reference signal and the radio base station specific offset for the timing of sending bursts downlink from the co-channel radio base stations towards mobile radio stations.

An advantage obtained with the present invention is that the offset allows the receiver to receive the wanted line of sight signal and also reflected signals if an equalizer is used in the receiver while rejecting co-channel signals because they have a time offset above a predetermined value.

A further advantage is the reduced disturbance. This may be used either for obtaining better quality i.e. improved carrier-to-interference ratio C/I, or increased traffic handling capacity.

BRIEF DESCRIPTION OF THE DRAWINGS

The invention will now be described more closely below with reference to the drawings, on which FIG. 1 schematically illustrates a cellular GSM network part structure to indicate how the beam pattern of an antenna array might be formed when a strong co-sequence interference is present, as the beam pattern is optimized for the training sequence used in a cell, FIG. 2 schematically shows three bursts to indicate when a co-sequence interference signal could be percepted as a desired signal component when received in the same receiving unit in a network structure of the kind indicated by FIG. 1, FIG. 3 schematically illustrates the structure of a training sequence arranged so as to provide good auto-correlation properties, FIG. 4 schematically illustrates the geometry of two co-sequence interfering cells to show some important parameters, FIG. 10 shows the geometry of a layer of one of the training sequence layers, included in the structure according to FIG. 9, FIG. 11 is a table indicating, for cells of a cellular network, linking of the cells to a number of potential co-sequence interferers and their parameters, FIG. 14 is a table providing examples of possible co-sequence and cross-correlation interference regions found between cells of a cellular network, FIG. 15 shows a cellular network structure for indicating cells that may contribute with a sufficiently high power to cause correlation problems, FIG. 16 shows a cellular network structure similar to that of FIG. 15, but indicating only cells having undesired correlation effects, i.e. co-sequence or cross-correlation effects.

DETAILED DESCRIPTION OF EMBODIMENTS

Figure 1:
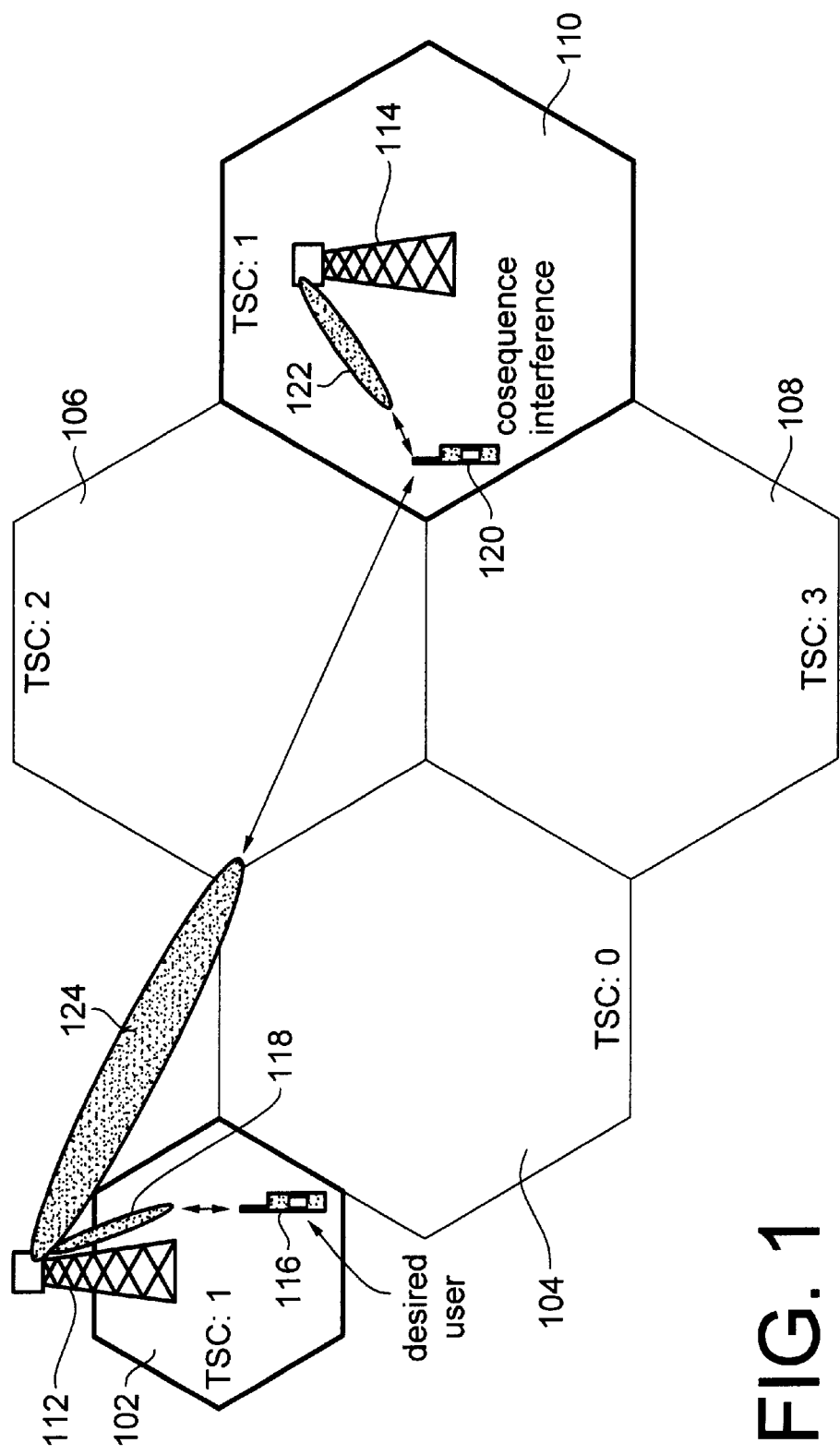

FIG. 1 illustrates the beam patterns of an antenna array in a cellular TDMA network when a strong co-sequence interference is present between two of the network's cells, i.e. two cells employing the same frequency and the same training sequence.

More particularly, FIG. 1 shows a GSM network part structure including five cells 102, 104, 106, 108 and 110, the cells 102 and 110 being separated from each other by the cells 104, 106 and 108. The base stations of cells 102 and 110 are indicated at 112 and 114. The cells 102 and 110 are using the same training sequence, as well as employing the same frequencies. It is therefore the question of possible co-sequence interference between the base stations 112 and 114, as will be explained below. The base stations of the cells 104, 106 and 108 have training sequences being different both mutually and with respect to the cells 102 and 110.

A mobile station 116 located in the cell 102 emits bursts to the network received by the base station 112 and resulting in a small narrow beam pattern 118 being formed towards the mobile station 116. Simultaneously, another mobile station 120 located in the co-sequence interfering cell 110 also emits bursts to the network received by the base station 114 and resulting in a beam pattern 122.

The bursts of the mobile station 120 are also, however, intercepted by the base station 112 and perceived as if they were desired bursts from the user 116. The base station 112 therefore perceives the co-sequence interference as a desired signal component and will amplify the interfering signal from the mobile station 120, this being indicated by a beam pattern 124.

Figure 2:
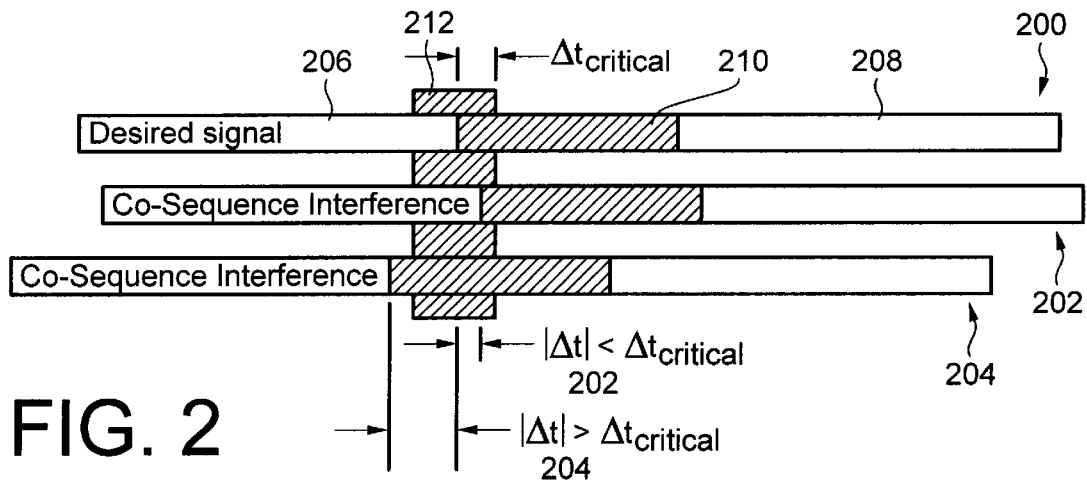

FIG. 2 illustrates a situation in which a co-sequence interference signal could be percepted as a desired signal component when received in the same receiving unit, e.g. the base station 112 in FIG. 1. More particularly, there are shown three received bursts 200, 202 and 204, respectively.

The bursts 200 and 202 are supposed to be a desired signal and a co-sequence interference signal, respectively, as e.g. arriving from the mobile stations 116 and 120, respectively, as discussed above with reference to FIG. 1. The burst 204 is supposed to be an alternative co-sequence interference signal and has been introduced in FIG. 2 for the purpose of further explanation. The three signals partially overlap along a time axis, not shown.

As is conventional, each burst has two packets of information surrounding a training sequence. Thus, the information packets and training sequence of the burst 200 are indicated at 206, 208 and 210, respectively. The bursts 202 and 204 are similarity structured as shown.

The partial overlapping between the burst 200, on the one hand, and the bursts 202 and 204, on the other hand, results in misalignments between the training sequence 210 of the burst 200 and the respective training sequences of the bursts 202 and 204.

The misalignment between the training sequence 210 of the desired burst 200 and that of the co-sequence interfering burst 202 is denoted $\Delta t_{202}$. The misalignment between the training sequence 210 and that of the co-sequence interfering burst 204 is denoted $\Delta t_{204}$. In FIG. 2 there is also shown a region 212 extending on both sides of the left hand end of the training sequence 210. This region 212 indicates a critical misalignment denoted $\Delta t_{critical}$ to each side of the left hand end of the training sequence 210.

As will be described more closely further on, a misalignment, such as the misalignments $\Delta t_{202}$ and $\Delta t_{204}$ between the training sequences of the co-sequence interfering signals 202 and 204, has to be more than the value $\Delta t_{critical}$ to ensure that co-sequence effects will not occur. As indicated in FIG. 2, $\Delta t_{202}$ is less than $\Delta t_{critical}$, whereas $\Delta t_{204}$ is greater than $\Delta t_{critical}$ meaning that co-sequence effects may occur in the case of the burst 202 but not in the case of the burst 204.

In case there would be complete overlap between a desired signal and a co-sequence interfering signal, and thus no misalignment, then $\Delta t$ for an interfering signal would be equal to 0 $T_S$, meaning that the two bursts would be synchronized at the receiving unit. $T_S$ designates a symbol time to be used henceforth when explaining different aspects of the invention.

The problem of having co-sequence interference, is that a number of features in the base and mobile station exploit the training sequence, in order to estimate the radio channel and in order to distinguish the desired signal components from the interfering components. Some of these features, being well-known to those of ordinary skill in the art, are Equalization
Measurement reporting
Diversity combining
Timing adjustment
Adaptive antenna functionalities (Uplink combining, etc.)

In an extreme case, such as the one described above with reference to FIG. 1, a base station can start to receive the bursts of a co-sequence interference signal instead of the desired signal. The timing functionality of the base station will synchronize on the wrong mobile station in the cases where the co-sequence interference is stronger than the signal from the desired mobile. The diversity combining, equalization and smart antenna combining algorithms will amplify the interference, as the base station receives the desired training sequence from the interference.

Below, transmission from a mobile station MS towards a base station BTS will be referred to as "uplink", and correspondingly transmission from a BTS towards an MS will be referred to as "downlink".

The previously described problem of correlated interference in the uplink direction can also appear in the downlink direction as the mobile station also uses training sequence code (TSC) dependent receiver algorithms.

As a background information, and with reference to "The GSM System for Mobile Communications, A comprehensive overview of the European Digital Cellular Systems", mentioned earlier above, the timing relationship between uplink and downlink can be described as follows.

As seen at the base station, the burst timing in the uplink direction is derived from the downlink direction by a delay of 3 burst periods, where each burst period has a value of 15/26 ms. This delay of nominally 3 burst periods is constant throughout GSM.

However, the delay between sent and received bursts of the mobile station is affected by the propagation delays which, even at the speed of light, are not negligible compared to the burst duration (the round-trip delay between an MS and a BTS 30 km apart is 200 μs).

When the mobile station is far from the BTS, propagation delays cannot be neglected, and an exact 3 burst period shift cannot be maintained both at the MS and at the BTS. It is, however, imperative that the bursts received at the BTS fit correctly into the time slots. Otherwise, the bursts from mobile stations using adjacent time slots could overlap, resulting in a poor transmission quality or even in a loss of communication.

The solution for this is that the mobile station advances its emission relatively to its reception by a time compensating the propagation delay. This value is called the timing advance, or TA, which will be used as a parameter in connection with describing the invention further below. The exact shift between downlink and uplink as seen by the mobile station is then 3 burst periods minus the timing advance. The timing advance value can be computed by the BTS, and is then provided to the mobile station through signalling.

Two parameters are involved when considering whether co- sequence interference is a problem, viz. power level of the interference and timing between the transmissions of base stations.

If the power level of the received interference can be assumed to be under a predetermined value due to path loss, the interference problem can be disregarded. The same is the case if the training sequences do not overlap in time. The behaviour of the timing and the power will now be studied.

Figure 3:
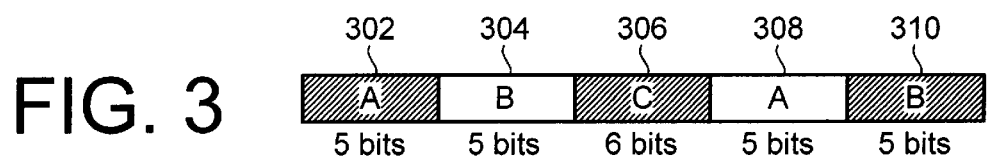

As regards timing between base stations there has, when defining the problem, to be distinguished between synchronized and non-synchronized networks. The structure of the training sequence is furthermore of importance. In GSM the training sequence consists of 3 different data entities A, B and C, arranged in five blocks in a way so as to have good auto-correlation properties. Thus, with reference to FIG. 3, the structure of the training sequence starts with a first block 302 of the data entity A followed by blocks 304, 306, 308 and 310 of the data entities B, C, A and B, respectively.

For non-synchronized networks, and assuming that the timing between base stations is uniformly random, it is possible to calculate that a significant probability for a co-sequence interference exists.

Figure 4:
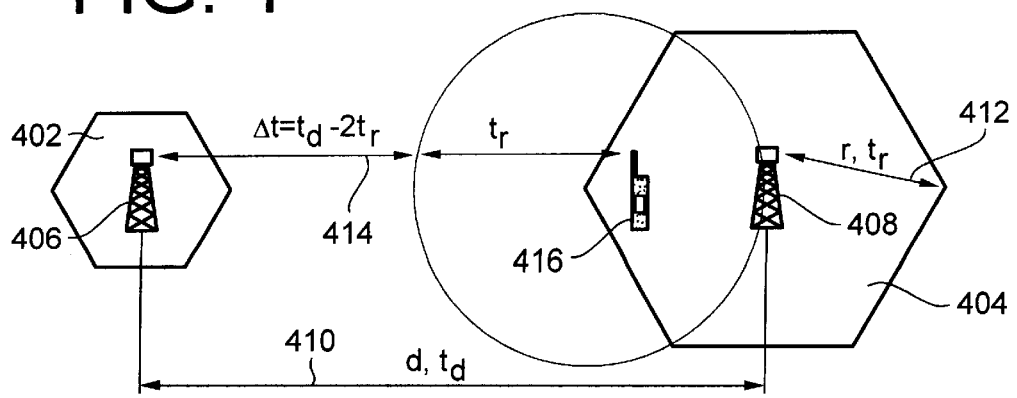

As regards a synchronized network, FIG. 4 illustrates three important parameters. In FIG. 4, two cells are indicated at 402 and 404, and their respective base stations at 406 and 408. The cells 402 and 404 are supposed to be co-sequence interfering. A first parameter is the distance d~$t_d$, indicated by double arrow 410, between the base stations 406 and 408. A second parameter is timing advance TA as described above. A third parameter is the "radius" r~$t_r$ of the cell 404, indicated by double arrow 412. The sign~indicates that distances d and r are related to their respective propagation times $t_d$ and $t_r$ by the speed of light c, i.e. $t_d$=d/c and $t_r$=r/c.

The propagation time $t_r$ between the base station 408 and the cell border is assumed to be half of the maximum timing advance TA value. In FIG. 4, the timing advance TA lets the interfering signal come earlier to the co-sequence cell. The misalignment Δt, indicated by double arrow 414, is the same in base station 406 uplink and mobile station 416 downlink and amounts to $t_d$−2$t_r$ in the example shown in FIG. 4, wherein the mobile 416 is supposed to be located near a border facing cell 402, and described more closely below.

The TA thus makes the co-sequence signal active earlier to the base station 406 in the cell 402 that uses the same training sequence. Suppose for example that the two co-sequence cells 402 and 404 have a distance between them of d=10 km and that the cell 404 has a radius r=4 km. In the cell 404 there is a mobile station 416 disturbing the cell 402. A problem will arise when the disturbing mobile 416 is close to the cell border facing the cell 402 as indicated in FIG. 4. In this case base station 406 will see the disturbing mobile with only d−2r=2 km (corresponding to 1.8 Ts) offset, i.e. the co-sequence interference will be included as a desired signal in algorithms which exploit the training sequence.

The second important parameter, which has to be examined to show whether there is a problem, is the sensitivity when the co-sequence power is low, i.e. the path loss between co-sequence cells might remove the problem. In order to show this, two algorithms for antenna arrays and diversity reception in the art referred to as MRC (for Maximum Ratio Combining) and IRC (for Interference Rejection Combining), have been simulated with co-sequence interference.

The first simulation evaluates the MRC algorithm on sector antennas, which corresponds to the diversity system operating in GSM today.

Figure 5:
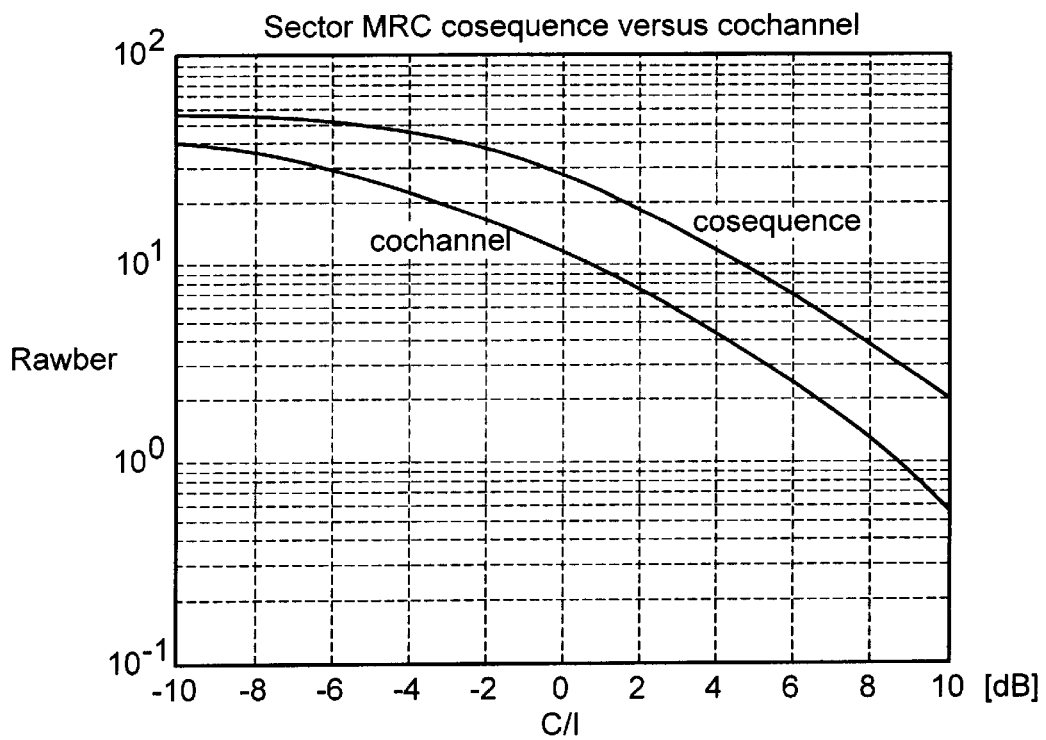
FIGS. 5 and 6 are curve diagrams illustrating-simulations of a MRC algorithm and an IRC algorithm, respectively, to illustrate the difference between co-channel and co-sequence interference.

FIG. 5 is a curve diagram showing the MRC algorithm on two branches, as a typical diversity base station works today.

The upper curve indicates co-sequence interference and the lower one indicates co-channel interference. As can be seen, the performance is approximately 4 dB worse in the case of co-sequence interference. The training sequence code in this case is TSC−no=2 of the GSM system. The delay Δt is 0 $T_S$.

It may be expected that the path loss between co-sequence cells is significantly larger than the path loss between neighbouring co-channel cells. If the path loss of a co-sequence signal to the desired carrier is 4 dB more than that of a co-channel signal, the disturbing effect of co-sequence will be the same as that of co-channel. It might also be expected that path loss will reduce co-sequence interference significantly.

Figure 6:
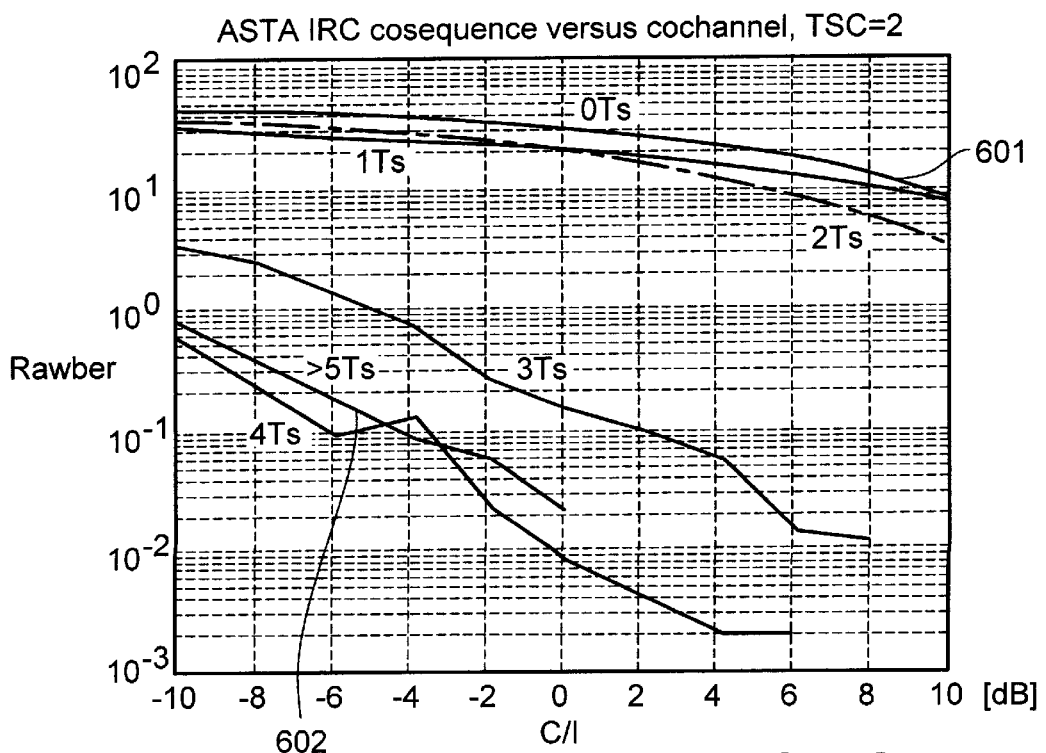

The second simulation evaluates an adaptive antenna system employing the IRC algorithm, with a result that appears from the curve diagram of FIG. 6. Delays of Δt=0, 1, . . . 5 $T_S$ were tested, in order to study the dependency of Δt, the corresponding curves being shown in FIG. 6.

FIG. 6 indicates that the co-sequence interference 601 requires in the order of 30 dB better C/I than the ordinary co-channel interference 602. This indicates that even though the path loss is larger for co-sequence interference than for co-channel interference, the co-sequence interference can still degrade the system performance significantly.

FIG. 6 furthermore shows the degradation for different time offsets Δt between the base station and the co-sequence interfering mobile station. In the earlier with reference to FIG. 4 described example concerning synchronized base stations, the offset was 2 km corresponding to 1.8 $T_S$. As can be seen in FIG. 6 this involves an extreme degradation of the performance.

In a first step of action the above described problems of having co-sequence interference can be dealt with by putting constraints on the frequency planning. The co-sequence cells have to be separated sufficiently in order to obtain sufficient path loss or timing misalignment. The co-sequence can also be reduced by increasing the frequency reuse distance. However, this solution will degrade capacity.

According to a broad aspect of the present invention, co-channel radio base stations using the same training sequences, or those having different training sequences but cross-correlation effects, are provided with a time reference signal being a synchronizing signal or a time reference from another co-channel radio base station. Each co-channel radio base station is furthermore provided with a radio base station specific time offset differing between the co-channel radio base stations by at least a predetermined value which prevents known sequences in desired signals and known sequences in interfering signals from overlapping in a disturbing way at reception. In each co-channel radio base station the time reference signal and the radio base station specific offset are used for the timing of sending bursts downlink from the co-channel radio base stations towards mobile radio stations.

The employed algorithms in the network are evaluated, e.g. by simulation, in order to determine the base station specific time offsets. FIG. 6 indicates for instance that when the time offset is 4 Ts or more, the co-sequence interference problem is significantly reduced. The optimization procedure is iterative, corresponding to ordinary frequency planning.

In a further step of action the inventive base station specific time offsets are exploited.

According to one embodiment of the invention, described below with reference to FIG. 7, the base stations are first synchronized and then an individual time-delay is inserted on each base station, in order to eliminate/reduce the co-sequence problem. The synchronization can be performed e.g. through a PCM link or by GPS. The wide tolerance of the synchronization accuracy allows a cheap/easy synchronization method.

In another embodiment, the offsets are adjusted at the individual base station by monitoring correlated interference.

Figure 7:
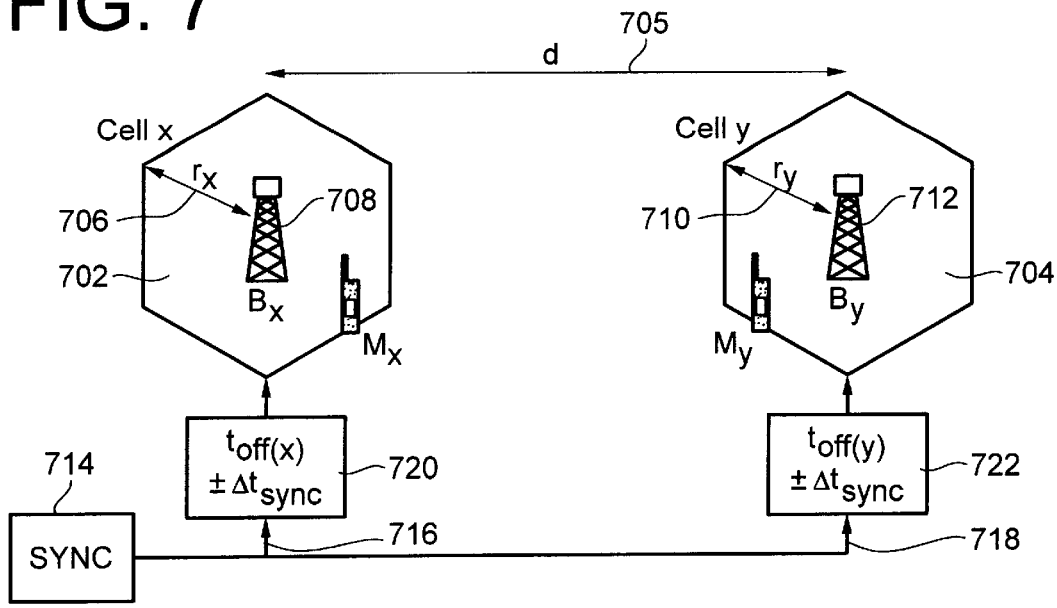
FIG. 7 shows an embodiment of the present invention indicating means for reducing correlated co-channel and co-sequence interference.

In FIG. 7 there are two co-sequence cells x and y, indicated at 702 and 704, respectively. There is a distance d, indicated by double arrow 705, between the co-sequence cells x and y. The distance d is a first parameter to be used in a geometrical procedure to be described later, and defines the propagation time between the cells.

The cell x has a radius $r_x$, indicated by double arrow 706, and a base station $B_x$, indicated at 708. The cell y has a radius $r_y$, indicated by double arrow 710, and a base station $B_y$, indicated at 712. The radii $r_x$ and $r_y$ are a second parameter to be used in the geometrical procedure.

In FIG. 7 there is also indicated a synchronization functionality, indicated by a block 714, for synchronizing the base stations 708 and 712, indicated by arrows 716 and 718, respectively. For each of the cells 702 and 704 there is a functionality, indicated by a respective block 720 and 722, for adding a respective offset parameter $t_{off(x)}$ and $t_{off(y)}$ as well as the tolerance $\pm\Delta t_{sync}$ of the synchronization functionality 714, to the respective base stations 708 and 712. The offset parameters $t_{off(x)}$ and $t_{off(y)}$ are used as adjustment means for avoiding the co-sequence interference phenomenon. The tolerance $\pm\Delta t_{sync}$ takes into account e.g. different lengths of cables between block 714 and the radio base stations 708 and 712.

When adequate base station specific time offset is used in individual base stations, the network avoids critical overlap of equal training sequences. One co-sequence layer can be planned independently of all others. The planning procedure will therefore be illustrated for one layer only in an example to be described later on.

With reference to the discussion with reference to FIG. 4, there can be set up the following equations defining the maximum and minimum propagation times between the two cells 702 and 704, expressed as the misalignment $\Delta t$, as shown in FIG. 2, between the respective training sequences of the co-sequence interference signal and the desired signal. Uplink and downlink are examined for both cells, which results in 4 sets of equations.

Uplink, mobile station $M_y$ to base station $B_x$, $\min(\Delta t) = t_d + t_{off(y)} - t_{off(x)} - 2\Delta t_{sync} - 2t_{ry}$ $\max(\Delta t) = t_d + t_{off(y)} - t_{off(x)} + 2\Delta t_{sync}$ Uplink, mobile station $M_x$ to base station $B_y$, $\min(\Delta t) = t_d + t_{off(x)} - t_{off(y)} - 2\Delta t_{sync} - 2t_{rx}$ $\max(\Delta t) = t_d + t_{off(x)} - t_{off(y)} + 2\Delta t_{sync}$ Downlink, base station $B_x$ to mobile station $M_y$, $\min(\Delta t) = t_d + t_{off(x)} - t_{off(y)} - 2\Delta t_{sync} - 2t_{ry}$ $\max(\Delta t) = t_d + t_{off(x)} - t_{off(y)} + 2\Delta t_{sync}$ Downlink, base station $B_y$ to mobile station $M_x$, $\min(\Delta t) = t_d + t_{off(y)} - t_{off(x)} - 2\Delta t_{sync} - 2t_{rx}$ $\max(\Delta t) = t_d + t_{off(y)} - t_{off(x)} + 2\Delta t_{sync}$ The task is to adjust $t_{off}$ for each cell with respect to the critical co-sequence cells, so that at never is in a critical region.

In order to illustrate the adjustment procedure, a graphical method will be described here. The above eight equations are included in a graphical overview according to FIG. 8, which can be used for the adjustment of the $t_{off}$ parameters and illustrates the influence of the different parameters. The x-axis is the adjustable $t_{off}$ parameter and the y-axis is the resulting misalignment, $\Delta t$. The width of the horizontal bar 802 covering the x-axis defines the critical region $\Delta t_{critical}$, where overlapping will cause problems.

Figure 8:
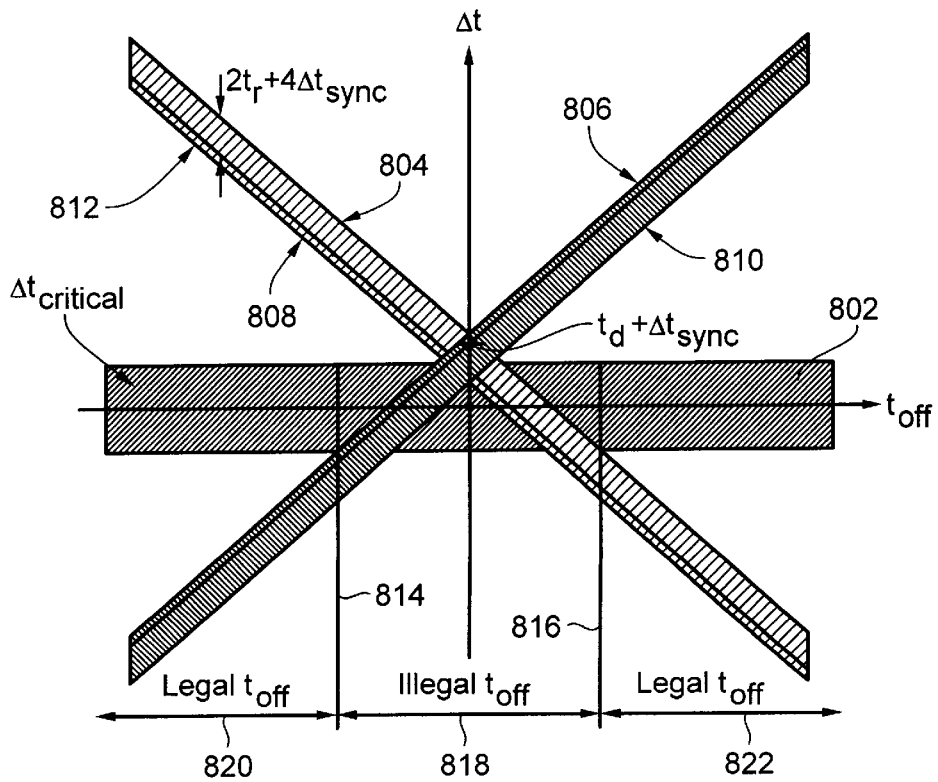
FIG. 8 is a graphical view indicating the influence of the parameters illustrated by FIG. 7, and also serving as a tool for finding a parameter value that avoids critical co-sequence interference, FIG. 9 schematically indicates a cellular network structure with all frequencies reused in all cells, and eight different training sequences being used to distinguish between signals from different cells.

The slanted bars of FIG. 8 show the timing relationship to the neighbouring cells. One bar is drawn for each disturbing signal, i.e. there are 4 bars $B_y \rightarrow M_x$ (804), $B_x \rightarrow M_y$ (806), $M_y \rightarrow B_x$ (808) and $M_x \rightarrow B_y$ (810) as appears from the above equations. The thickness of each of the bars depends on the possible variation, i.e the maximum propagation time in the cell containing the mobile, $t_r$, and the tolerance of the synchronization signal, $\Delta t_{sync}$. The difference between min ($\Delta t$) and max ($\Delta t$) is indicated at 812 as $2t_r + 2\Delta t_{sync}$.

Vertical lines 814 and 816 extending through crossings where the bars 804, 806, 808 and 810 meet the horizontal bar 802 indicate borders between "illegal" area 818 and "legal" areas 820 and 822 for $t_{off}$.

The geometrical adjustment procedure can be summarized as follows, step by step.

A. Ordinary Frequency Planning.

This part of the procedure consists of the ordinary planning, i.e.:

Distributing frequencies to cells;

Setting the parameters $t_d$, $t_r$;

Distributing the training sequences.

B. Find Critical Misalignments, $\Delta t_{critical}$.

Estimate an acceptable misalignment, e.g. $|\Delta t| > 5$ $T_S$.

C. Identify Co-Sequence Layers.

The cells with particular training sequence codes TSCs and equal frequencies are identified and treated independently. Each group of cells with equal TSC will be referred to as a TSC-layer.

D. Identify co-sequence cells with too little path loss (i.e. causing disturbance).

For each cell co-sequence cells with a sufficiently low path loss are identified. The path loss limit has to be determined from measurements/simulations of TSC dependent algorithms. E.g. FIG. 6 indicates that an examplary IRC algorithm for uplink combining is very sensitive to co-sequence interference, and therefore requires a high path loss. A path loss of 30 dB more than the co-channel interference, would make the effects from co-sequence interference comparable to co-channel effects.

E. Find the Geometrical Parameters of the Network.

The parameters are setup in a tabular form. Each cell is linked to a group of cells, which are potential co-sequence interfering cells. Find:

The distances, d, between individual co-sequence cells;

The radii, r, of all cells in the co-sequence layer.

F. Adjust Time Offsets Between Co-Sequence Cells.

The graphical overview is drawn for one cell with respect to all the cells found as potential co-sequence cells. The time offsets, $t_{off}$, are adjusted for this cell, and then all cells in co-sequence tier one are adjusted, etc . . . Tier is a ring of cells to be explained below.

Below an example of the training sequence planning procedure will be described, by explaining the required steps A–F. The procedure results in a network design, which ensures that all co-sequence interferers with too small path loss compared to the path loss of the co-channel interferers, will be shifted in time with respect to each other by a minimum of 5 $T_S$. The example is based on the following assumptions:

1. Measurements/simulations have shown that the critical overlapping area is $-5Ts<\Delta t<+5Ts$.

2. A co-sequence cell is disregarded, when the propagation loss from it to the cell of interest is over 30 dB more than the propagation loss from the co-channel cell to the cell of interest.

3. The frequency reuse factor is K=1/1, so all frequencies are used in all cells.

4. The cellular structure is homogeneous, and the radius of each cell is r=500 m.

5. The tolerance on the synchronization unit is $\Delta t_{sync}=1$ Ts.

Step A:

FIG. 9 shows the presumed cellular network structure with all frequencies reused in all cells, and only the 8 different training sequences being used to distinguish between signals from different cells. The digit within each cell corresponds to a TSC-number used in the cell as indicated at 901 by arrows pointing to two cells having the TSC-numbers 0 and 2, respectively. The Figure also indicates two adjacent clusters 902 and 904 of cells, the borders of which are brought out by thick lines, and which each contain 8 cells of equal size among which the 8 possible TCS-numbers are distributed. In the whole network structure, the 8 training sequences are distributed in similar clusters.

By a double arrow 906 the distance d between two co-sequence cells 908 and 910, having the TSC-number 5, in the clusters 902 and 904, respectively, is indicated. At 912 the radius r of one of the cells is indicated within arrows. The relation between the distance d and radius r is determined by the equation $d=r\sqrt{3N}$, N=8.

Step A corresponds to the conventional planning of frequencies and cell dimensions.

In step B it is found by measurements/simulations that the critical overlapping region is $-5Ts<\Delta t<+5Ts$.

In step C the cells with the same training sequence number are grouped together, into 8 different TSC-layers. The clustering of sequences corresponds to the ordinary frequency clustering, and the expression "tier" is therefore reused as "co-sequence tier" in the case of co-sequence planning. FIG. 10 shows the geometry of one TSC layer, for TSC 3, similar to the geometry of a frequency reuse clustering, there being a first tier 1002 containing cells B–G, surrounding cell A, and a second tier 1004 of the TSC 3 layer.

In step D it is assumed that if a cell is so far away that the path loss is larger than 30 dB, its influence is insignificant as compared to ordinary co-channel interference. Power control and path loss have to be taken into account, when considering which cells have a sufficiently high power level to cause co-sequence problems.

When disregarding the power control, the difference between path loss of the desired signal and path loss of the co-sequence interference in the first co-sequence tier, can be calculated as $10\log(((d-r)/r)^{3.5})=21$ dB, in the worst case. The difference with respect to the second co-sequence tier becomes approximately $10\log(((2d-r)/r)^{3.5})=33$ dB. In this example it is assumed that only the first co-sequence tier is causing co-sequence problems, and the second one is attenuated sufficiently due to path loss.

The purpose of step E is to provide an overview in the form of a table or database, schematically illustrated by FIG. 11.

The table according to FIG. 11 in the first column contains all cells in the network which are to be time offset relative each other. Each of these cells is linked to a number of potential co-sequence interferers and their parameters, appearing in the second and further columns, respectively.

The table/database thus contains all the parameters in a linked way so that an iterative optimization program can start with row one, and go through the table until a solution is found. As the cellular structure is homogeneous, the table with linked cells also becomes homogeneous.

Figure 12:
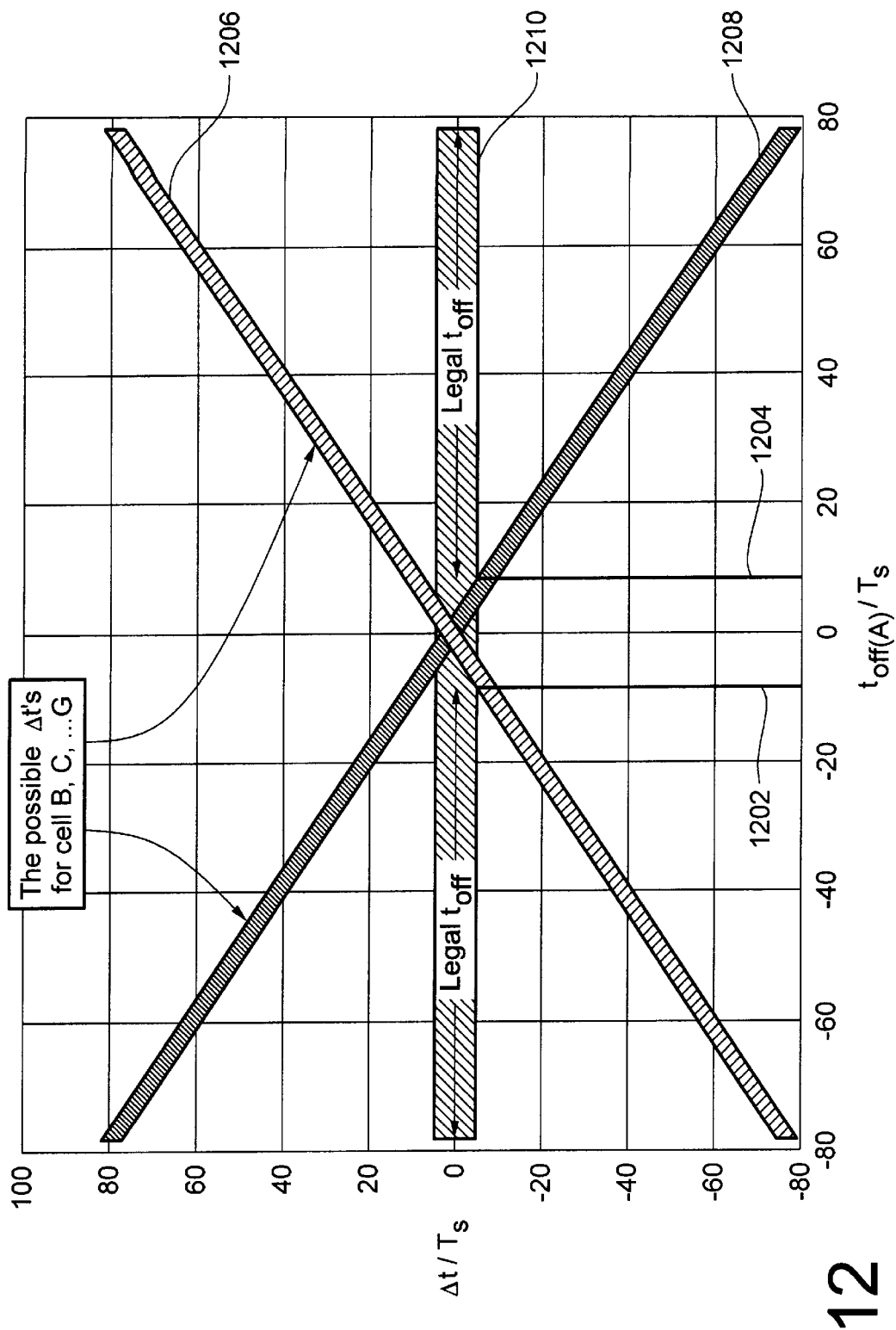
FIG. 12 is a graph showing the relationship between cells included in the table of FIG. 11, and more particularly between one of these cells and a number of the other cells being co-sequence cells.

Step F starts the time adjustment procedure, following the table according to FIG. 11. First a graph according to FIG. 12 is drawn showing the relationship between cell A and the linked co-sequence cells B, C, D, E, F and G in the table. From FIG. 12 it can be seen that if no time offset is inserted, i.e. $t_{off(A)}=0$ $T_S$, there is co-sequence interference present in the system. However by inserting a time offset of more than 10 $T_S$ or less than $-10$ $T_S$, cell A will not transmit nor receive co-sequence interference. The time offset for cell A, $t_{off(A)}$ is chosen to 10 Ts. In FIG. 12, the reason for this appears from vertical lines 1202 and 1204 extending through crossings where the slanted bars 1206 and 1208 meet the horizontal bar 1210, in the same way as has been explained for FIG. 8.

Figure 13:
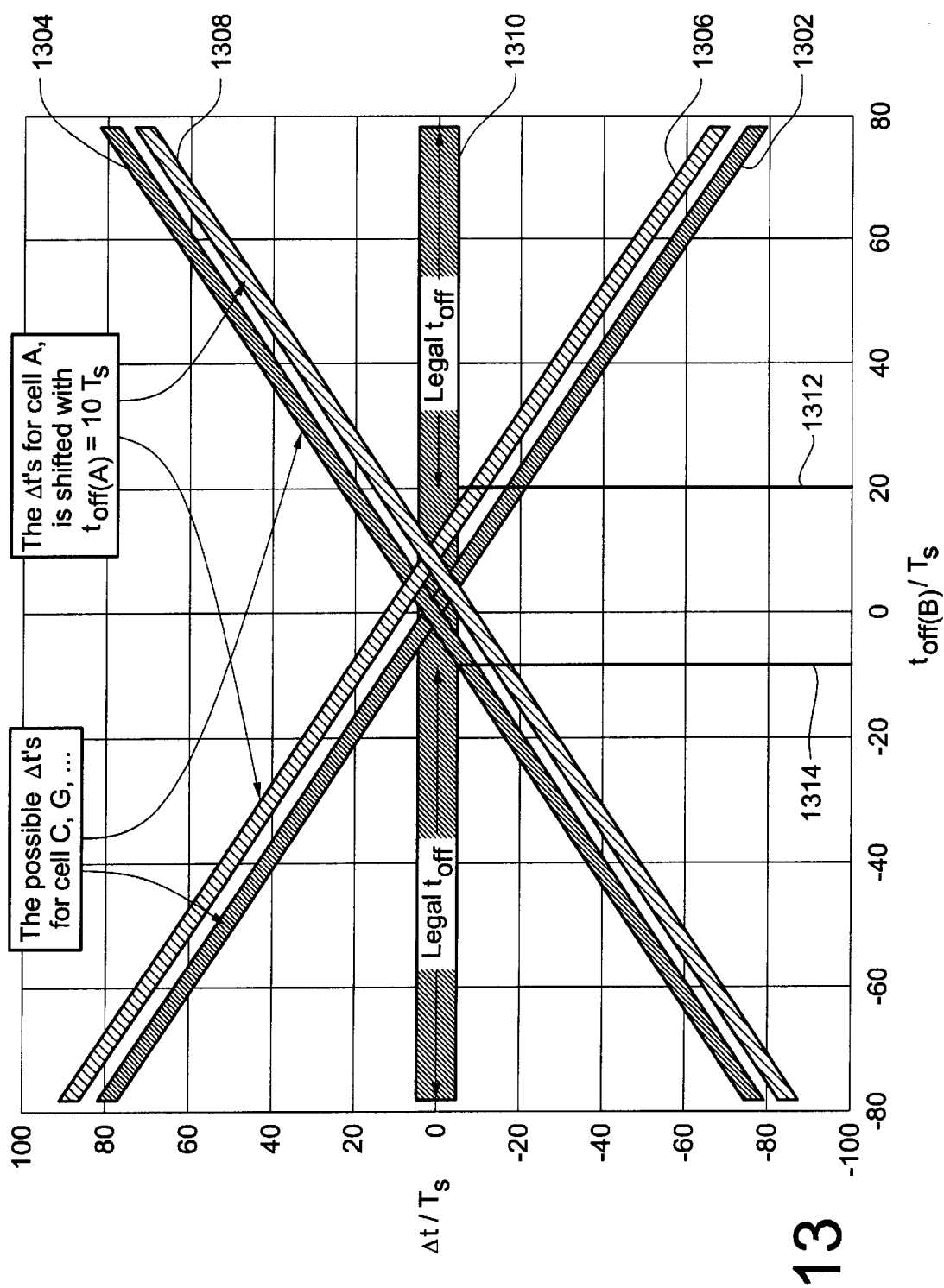
FIG. 13 is a graph similar to that of FIG. 12, showing the timing relationship for the cell illustrated by FIG. 12 when one co-sequence cell is shifted in time.

The adjustment of cell A is now finished, and cell A is avoiding all risks of co-sequence interference from co-sequence tier 1. The next step is then to adjust cell B to all cells in its first co-sequence tier, this being illustrated by the graph according to FIG. 13. Slanted bars 1302 and 1304 indicate possible $\Delta t$'s for cells C, G, . . . and slanted bars 1306 and 1308 indicate $\Delta t$'s for cell A. The crossings between bars 1302, 1304, 1306 and 1308, on the one hand, and horizontal bar 1310, on the other hand, in this graph indicate the possible adjustment of the time offset for cell B, $t_{off(B)}$, in the same way as has been explained above with reference to FIG. 8. The co-sequence cell A has already been adjusted and is therefore shifted in the graph, as indicated by the location of bars 1306 and 1308. Cell A is in cell B's first co-sequence tier and the time offset t for cell B has to be higher than 20 $T_S$ or less than $-10$ $T_S$ as indicated by vertical lines 1312 and 1314 extending through the crossings where the bar 1306 and the bar 1304, respectively, meet the horizontal bar 1310.

The next step is to adjust the time offset $t_{off(C)}$ for cell C. Now there are two already adjusted cells, viz. cells A and B, in co-sequence tier 1 of cell C. Therefore the available space has been further reduced by 10 $T_S$. By considering the graph in FIG. 13 it can be seen that as much as 16 cells can be adjusted with respect to each other. In this example it is only necessary to adjust 3 cells to each other, as only the first co-sequence tier is taken into account.

The cell structure in this example has been homogeneous, since all cells are supposed to have the same dimensions. If this is changed, it will only involve some minor differences between the individual cells in the graphs. If d for example is increased with 1.1 km this will only correspond to adding one symbol time to Δt. There has furthermore been included a tolerance, $Δt_{sync}$, on the synchronization unit of ±1 $T_S$. Furthermore, $Δt_{critical}$ has been set to be within the region [−5 $T_S$; +5 $T_S$], which probably is an overshoot as indicated in FIG. 6, where Δt isn't that critical for the values of 4 and 5 $T_S$.

In the solution of the example described above with reference to FIGS. 9–13, it was possible to avoid co-sequence interference by using time offsetting. It may, however, be assumed that this will not always be possible, in case cell dimensions and power levels are very unbalanced. In such cases the solution may be to simulate the critical algorithms, as e.g. the IRC algorithm according to FIG. 6. The results obtained through such simulations can then be used to optimize the individual time offsets of the network up to a certain optimum point. The co-sequence effects will perhaps not be ideally -avoided, as in the example described above, but they will be reduced to a satisfying level by minimizing the probability of critical co-sequence overlap, i.e. overlapping <$Δt_{critical}$.

In this situation the timing of the network is preferably optimized by setting up a cost function, as a function of time overlap and/or performance degradation.

Above, co-sequence interference has been discussed that can arise between co-channel cells having the same training sequence. The invention in this case is how to remove correlation effects from an undesired co-sequence interfering source. Problems with co-sequence interference can appear when tight frequency schemes are used, simultaneously using techniques exploiting correlation effects of the received- signals. However, correlation problems can in addition occur due to the ordinary co-channel interference. The reason for the appearance of these degradations is that the different training sequences in GSM often are highly correlated. The present invention which so far has been described in connection with removing effects caused by co-sequence interference, can also be used successfully for removing undesired cross-correlation effects caused by ordinary co-channel interference.

With a few exceptions, the geometrical adjustment procedure using steps A–F described above can also be used for removing undesired cross-correlation effects caused by disturbing co-channel interference. A difference is that co-channel interferences in combination with training sequences with disturbing cross-correlation effects should also be adjusted in time to avoid overlapping in receiving units. It should be noted that the undesired overlapping region, referred to in FIG. 8 as $Δt_{critical}$, can be different for different pairs of training sequences.

The modifications to the procedure according to steps A–F described earlier are as follows.

In modified step B, the critical misalignments have to be found independently for different training sequences, i.e. there is a $Δt_{critical(x/y)}$, where x is the number of the desired training sequence, and y is the number of the interfering training sequence.

The table shown in FIG. 14 provides an example of found critical regions. In the table, the desired training sequence is supposed to be No. 0, as appears from the first term within brackets in all lines of the table. In the first row in the table, wherein also the interfering training sequence is indicated to be No. 0, compare the last term within the brackets, the co-sequence interference is shown to have the same critical region as in the earlier examples, namely −5 $T_S$<Δt<+5 $T_S$.

When the interfering source has training sequence No. 1, as appearing on line 2 of the table, compare the last term within the brackets, only overlapping for 0 $T_S$<Δt<+3 $T_S$ has been found critical. However, if the interfering source has training sequence No. 7, as appearing on the last line of the table, compare the last term within the brackets, the algorithms of concern will not be affected by cross-correlation effects.

In modified step C, a group of potentially disturbing cells should be identified based on the size of the propagation loss. FIG. 15 shows an example of a cellular network structure in which the cells that are together bounded by thicker lines all may contribute with a sufficiently high power to cause correlation problems. The cell indicated at 1502 has the desired training sequence 0, whereas the cell indicated at 1504 has the co-sequence interference training sequence 0.

For each cell, all co-channel and co-sequence interfering cells which might interfere with a power, which is sufficiently high to create undesired correlation effects, should be identified.

In modified step D the group identified in modified step C should be limited to cells having undesired correlation effects. Referring to FIG. 16, illustrating the same cellular network structure as in FIG. 15, these cells are the co-sequence cell 1504 and a co-channel cell 1602 having training sequence number 1 and indicated in line 2 in the Table of FIG. 14.

Following the above modified steps B–D, the procedure continues along the same principles as described earlier for steps E and F.

Thus, in step E the geometrical parameters of the network should be found as described.

In step F adjustment of time offsets between co-sequence cells is performed. The cells are adjusted one by one with respect to the potentially disturbing cells found in modified step D. The adjustment can be performed with the same geometrical method as already described, however with different critical regions for different interfering cells.

Figure 17:
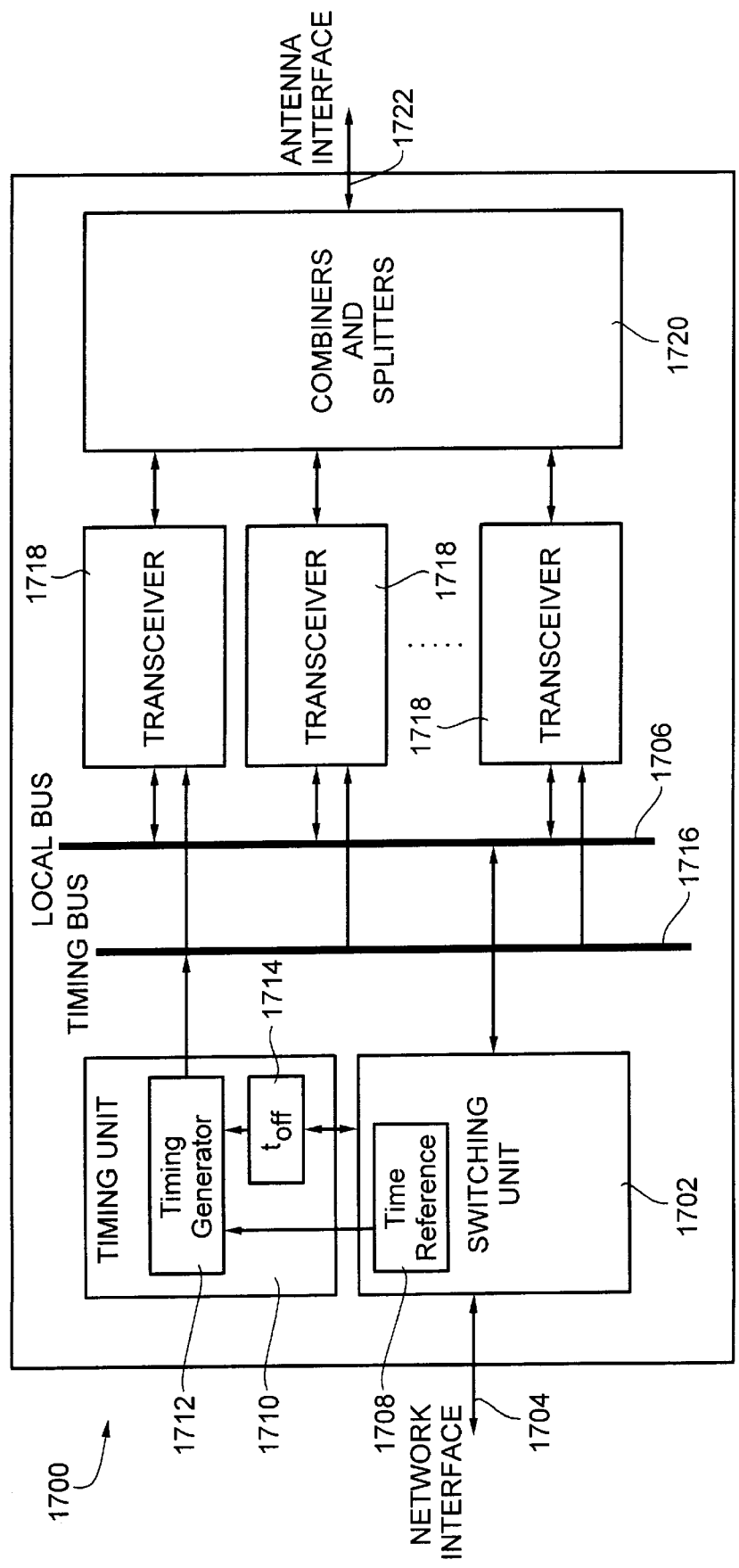
FIG. 17 is a schematical block diagram of a radio base station for use in a cellular mobile radio system according to the invention.

FIG. 17 schematically illustrates a radio base station 1700 for use in a cellular mobile radio system according to the invention of the kind described above.

In FIG. 17 block 1702 indicates a switching unit being connected, indicated by arrow 1704, to a network interface, and to a local bus 1706. The switching unit 1702 includes a function, indicated by block 1708, for receiving a time reference signal, such as a synchronization signal from the network or a base station time reference from an antenna interface.

In a timing unit, indicated by block 1710, there is a timing generator, indicated by block 1712, for receiving the time reference signal from the time reference receiving function 1708. The timing unit 1710 also includes a store, indicated by block 1714, for storing a radio base station specific time offset of the kind that has been explained and described earlier with reference to FIGS. 7–16. As has been explained, this time offset differs between co-channel radio base stations located in the same cellular mobile radio base system by at least a predetermined value which prevents known sequences in desired signals and known sequences in interfering signals from overlapping in a disturbing way at reception.

The time offset is received by the store 1714 via the switching unit 1702 and transferred to the timing generator 1712. Via a timing bus 1716, the time reference signal and the radio base station specific offset are received by transceivers 1718 communicating with the local bus 1706. The transceivers 1718 use the time reference signal and the radio base station specific offset for the timing of sending bursts downlink towards mobile radio stations via combiners and splitters, indicated by a common block 1720, and an antenna interface, the connection to which being indicated by a double arrow 1722.

What is claimed is:

1. A method in a cellular mobile radio system including a plurality of radio base stations and mobile radio stations,
   said radio base stations using, as units of transmission, bursts organized in groups, each group forming a frame of the type used by a Time Division Multiple Access (TDMA) system, and each burst containing a known sequence of data bits,
   at least two of the radio base stations being co-channel radio base stations employing a same frequency,
   said method comprising the steps of
   providing the co-channel radio base stations with a time reference signal being a synchronizing signal or a time reference from another co-channel radio base station,
   providing each co-channel radio base station with a radio base station specific time offset differing between the co-channel radio base stations by at least a predetermined value which prevents known sequences in desired signals and known sequences in interfering signals from overlapping in a disturbing way at reception, and
   using in each co-channel radio base station the time reference signal and the radio base station specific offset for the timing of sending bursts downlink from the co-channel radio base stations towards mobile radio stations.

2. A method according to claim 1, wherein the steps of providing a time reference signal and radio base station specific time offsets comprise the substeps of
   identifying within said cellular mobile radio system cells having co-channel radio base stations, wherein there is a risk that a co-channel mobile radio station in one of said cells will come in sight of a co-channel radio base station in another one of said cells, and
   synchronizing, by means of said time reference signal, said co-channel radio base stations of said identified cells while providing in each co-channel radio base station said radio base station specific time offset as being a fraction of the duration of a burst, but enough to prevent known sequences in desired signals and known sequences in interfering signals from overlapping in a disturbing way at reception.

3. A method according to claim 2, further comprising disregarding, for each layer, cells having a power level too low to cause said interference problem.

4. A method in a cellular mobile radio system including a plurality of radio base stations and mobile radio stations,
   said radio base stations using as units of transmission bursts organized in groups, each group forming a frame of the type used by a Time Division Multiple Access (TDMA) system and each burst containing a known sequence of data bits
   at least two of the radio base stations being co-channel radio base stations employing a same frequency,
   said method comprising the steps of
   providing the co-channel radio base stations with a time reference signal being a synchronizing signal or a time reference from another co-channel radio base station, wherein the step of providing a time reference signal and radio base station specific time offsets comprise the substeps of
   identifying within said cellular mobile radio system cells having co-channel radio base stations, wherein there is a risk that a co-channel mobile radio station in one of said cells will come in sight of a co-channel radio base station in another one of said cells, wherein the identifying step includes identifying co-sequence cells employing the same known sequence, making said interference problem a co-sequence interference problem, and
   synchronizing, by means of said time reference signal, said co-channel radio base stations of said identified cells while providing in each co-channel radio base station said radio base station specific time offset as being a fraction of the duration of a burst, but enough to prevent known sequences in desired signals and known sequences in interfering signals from overlapping in a disturbing way at reception;
   providing each co-channel radio base station with a radio base station specific time offset differing between the co-channel radio base stations by at least a predetermined value which prevents known sequences in desired signals and known sequences in interfering signals from overlapping in a disturbing way at reception, and
   using in each co-channel radio base station the time reference signal and the radio base station specific offset for the timing of sending bursts downlink from the co-channel radio base stations towards mobile radio stations.

5. A method according to claim 4, wherein the step of identifying includes grouping together the co-sequence cells into layers including each only cells having a same known sequence, and investigating said risk separately for each layer.

6. A method according to claim 5, further comprising the steps of determining successively, for each layer, the necessary time offset-for each co-channel radio base station while taking into consideration any time offsets already determined for other co-channel radio base stations.

7. A method according to claim 6, further comprising using as parameters, for said successive determining step,
   the distance between co-sequence cells,
   the radii of the cells, and
   inaccuracy in the synchronization, contributing to variation in the synchronization time.

8. A method in a cellular mobile radio system including a plurality of radio base stations and mobile radio stations,
   said radio base stations using, as units of transmission, bursts organized in groups, each group forming a frame of the type used by a Time Division Multiple Access (TDMA) system, and each burst containing a known sequence of data bits,
   at least two of the radio base stations being co-channel radio base stations employing a same frequency,
   said method comprising the steps of
   providing the co-channel radio base stations with a time reference signal being a synchronizing signal or a time reference from another co-channel radio base station,
   providing each co-channel radio base station with a radio base station specific time offset differing between the co-channel radio base stations by at least a predetermined value which prevents known sequences in desired signals and known sequences in interfering signals from overlapping in a disturbing way at reception, using in each co-channel radio base station the time reference signal and the radio base station specific offset for the timing of sending bursts downlink from the co-channel radio base stations towards mobile radio stations, and simulating disturbance and using the results thereof to determine the radio base station specific time offsets.

9. A cellular mobile radio system including a plurality of radio base stations and mobile radio stations, said radio base stations using, as units of transmission, bursts organized in groups, each group forming a frame of the type used by a Time Division Multiple Access (TDMA) system, and each burst containing a known sequence of data bits, at least two of the radio base stations being co-channel radio base stations employing a same frequency, said system further comprising means for providing the co-channel radio base stations with a time reference signal being a synchronizing signal or a time reference from another co-channel radio base station, means for providing each co-channel radio base station with a radio base station specific time offset differing between the co-channel radio base stations by at least a predetermined value which prevents known sequences in desired signals and known sequences in interfering signals from overlapping in a disturbing way at reception, and means enabling using in each co-channel radio base station the time reference signal and the radio base station specific offset for the timing of sending bursts downlink from the co-channel radio base stations towards mobile radio stations.

10. A system according to claim 9, wherein the means for providing a time reference signal and radio base station specific time offsets comprise means for identifying within said cellular mobile radio system cells having co-channel radio base stations, wherein there is a risk that a co-channel mobile radio station in one of said cells will come in sight of a co-channel radio base station in another one of said cells, and means for synchronizing, by means of said time reference signal, said co-channel radio base stations of said identified cells while providing in each co-channel radio base station said radio base station specific time offset as being a fraction of the duration of a burst, but enough to prevent known sequences in desired signals and known sequences in interfering signals from overlapping in a disturbing way at reception.

11. A system according to claim 9, further comprising means for finding, for each layer, cells having a power level too low to cause said interference problem, and disregarding such cells.

12. A cellular mobile radio system including a plurality of radio base stations and mobile radio stations.

said radio base stations using, as units of transmission, bursts organized in groups, each group forming a frame of the type used by a Time Division Multiple Access (TDMA) system, and each burst containing a known sequence of data bits, at least two of the radio base stations being co-channel radio base stations employing a same frequency, said system further comprising means for providing the co-channel radio base stations with a time reference signal being a synchronizing signal or a time reference from another co-channel radio base station, means for providing each co-channel radio base station with a radio base station specific time offset differing between the co-channel radio base stations by at least a predetermined value which prevents known sequences in desired signals and known sequences in interfering signals from overlapping in a disturbing way at reception, wherein the means for providing a time reference signal and radio base station specific time offsets comprise means for identifying within said cellular mobile radio system cells having co-channel radio base stations, wherein there is a risk that a co-channel mobile radio station in one of said cells will come in sight of a co-channel radio base station in another one of said cells, wherein the identifying means include means for identifying co-sequence cells employing the same known sequence, making said interference problem a co-sequence interference problem, and means for synchronizing, by means of said time reference signal, said co-channel radio base stations of said identified cells while providing in each co-channel radio base station said radio base station specific time offset as being a fraction of the duration of a burst, but enough to prevent known sequences in desired signals and known sequences in interfering signals from overlapping in a disturbing way at reception, and means enabling using in each co-channel radio base station the time reference signal and the radio base station specific offset for the timing of sending bursts downlink from the co-channel radio base stations towards mobile radio stations.

13. A system according to claim 12, wherein the means for identifying include means for grouping together the co-sequence cells into layers including each only cells having a same known sequence, and means for investigating said risk separately for each layer.

14. A system according to claim 13, further comprising means for determining successively, for each layer, the necessary time offset for each co-channel radio base station while taking into consideration any time offsets already determined for other co-channel radio base stations.

15. A system according to claim 14, wherein, in said succesive determining means, the following parameters are used the distance between co-sequence cells, the radii of the cells, and inaccuracy in the synchronization, contributing to variation in the synchronization time.

16. A cellular mobile radio system including a plurality of radio base stations and mobile radio stations, said radio base stations using, as units of transmission, bursts organized in groups, each group forming a frame of the type used by a Time Division Multiple Access (TDMA) system, and each burst containing a known sequence of data bits, at least two of the radio base stations being co-channel radio base stations employing a same frequency, said system further comprising means for providing the co-channel radio base stations with a time reference signal being a synchronizing signal or a time reference from another co-channel radio base station, means for providing each co-channel radio base station with a radio base station specific time offset differing between the co-channel radio base stations by at least a predetermined value which prevents known sequences in desired signals and known sequences in interfering signals from overlapping in a disturbing way at reception, means enabling using in each co-channel radio base station the time reference signal and the radio base station specific offset for the timing of sending bursts downlink from the co-channel radio base stations towards mobile radio stations, and means for simulating disturbance and using the results thereof to determine the radio base station specific time offsets.

17. A radio base station for use in a cellular mobile radio system including a plurality of radio base stations and mobile radio stations, said radio base stations using, as units of transmission, bursts organized in groups, each group forming a frame of the type used by a Time Division Multiple Access (TDMA) system, and each burst containing a known sequence of data bits, at least two of the radio base stations being co-channel radio base stations employing a same frequency, said radio base station comprising means for receiving a time reference signal, means for storing a radio base station specific time offset differing between co-channel radio base stations by at least a predetermined value which prevents known sequences in desired signals and known sequences in interfering signals from overlapping in a disturbing way at reception, and means for making use of the time reference signal and this radio base station specific offset for the timing of sending bursts downlink from the co-channel radio base stations towards mobile radio stations.

* * * * *